US009036332B2

(12) United States Patent
Shukla et al.

(10) Patent No.: US 9,036,332 B2
(45) Date of Patent: May 19, 2015

(54) ENERGY STORAGE DEVICE, AN INORGANIC GELLED ELECTROLYTE AND METHODS THEREOF

(75) Inventors: Ashok Kumar Shukla, Karnataka (IN); Anjan Banerjee, Karnataka (IN); Musuwathi Krishnamoorthy Ravikumar, Karnataka (IN); Shaik Abdul Gaffoor, Karnataka (IN)

(73) Assignee: Indian Institute of Science, Bangalore (IN)

( * ) Notice: Subject to any disclaimer, the term of this patent is extended or adjusted under 35 U.S.C. 154(b) by 292 days.

(21) Appl. No.: 13/552,097

(22) Filed: Jul. 18, 2012

(65) Prior Publication Data

US 2012/0327560 A1   Dec. 27, 2012

Related U.S. Application Data

(63) Continuation of application No. PCT/IB2012/053658, filed on Jul. 18, 2012, and a continuation of application No. PCT/IN2010/000439, filed on Jun. 28, 2010.

(30) Foreign Application Priority Data

Jun. 22, 2010 (IN) ............................ 1744/CHE/2010
Jul. 18, 2011 (IN) ............................ 2441/CHE/2011

(51) Int. Cl.
*H01G 9/00*     (2006.01)
*H01G 11/04*    (2013.01)
(Continued)

(52) U.S. Cl.
CPC ............... *H01G 11/04* (2013.01); *Y10T 29/417* (2015.01); *Y02E 60/13* (2013.01); *H01G 11/30* (2013.01); *H01G 11/52* (2013.01); *H01G 11/54* (2013.01)

(58) Field of Classification Search
CPC ....... H01G 11/58; H01G 11/04; H01G 11/12; H01G 9/155
USPC ......... 361/502–504, 512, 516–519, 523, 525, 361/528
See application file for complete search history.

(56) References Cited

U.S. PATENT DOCUMENTS 3,536,531 A   10/1970   Sekido et al.
4,326,017 A   4/1982    Will
(Continued)

FOREIGN PATENT DOCUMENTS

WO   WO 02/19357    3/2002
WO   WO 02/091412   11/2002
(Continued)

OTHER PUBLICATIONS

Pell W.G. at al., "Peculiarities and requirements of asymmetric capacitor devices based on combination of capacitor and battery-type electrodes".

(Continued)

*Primary Examiner* — Nguyen T Ha
(74) *Attorney, Agent, or Firm* — Del Vecchio and Stadler LLP

(57) ABSTRACT

The present disclosure is related to hybrid capacitors specifically to $PbO_2$/Activated Carbon hybrid ultracapacitors. The present disclosure is also related to hybrid capacitors specifically to $PbO_2$/Activated Carbon hybrid ultracapacitors with an inorganic thixotropic-gelled-polymeric-electrolyte. The hybrid ultracapacitors of the present disclosure is simple to assemble, bereft of impurities and can be fast charged/discharged with high faradiac-efficiency.

8 Claims, 6 Drawing Sheets

(51) Int. Cl.
  *H01G 11/30* (2013.01)
  *H01G 11/52* (2013.01)
  *H01G 11/54* (2013.01)

(56) References Cited

U.S. PATENT DOCUMENTS

| | | | |
|---|---|---|---|
| 5,079,674 | A | 1/1992 | Malaspina |
| 6,129,822 | A | 10/2000 | Ferdman |
| 6,352,622 | B1 | 3/2002 | Brown et al. |
| 6,842,331 | B1 | 1/2005 | Kazaryan et al. |
| 7,923,151 | B2 * | 4/2011 | Lam et al. .................. 429/225 |
| 2006/0291139 | A1 | 12/2006 | Nedoshivin et al. |
| 2007/0128472 | A1 | 6/2007 | Tierney et al. |
| 2009/0103242 | A1 | 4/2009 | Buiel |
| 2010/0203362 | A1 | 8/2010 | Lam et al. |
| 2010/0304219 | A1 | 12/2010 | Schaeffer et al. |
| 2013/0063866 | A1 * | 3/2013 | Shukla et al. .................. 361/502 |

FOREIGN PATENT DOCUMENTS

| | | |
|---|---|---|
| WO | WO 2003/098648 A1 | 11/2003 |
| WO | WO 2005/027255 A1 | 3/2005 |
| WO | WO 2007/001201 A1 | 1/2007 |
| WO | WO 2007/001202 A1 | 1/2007 |
| WO | WO 2008/070914 | 6/2008 |
| WO | WO 2009/052124 | 4/2009 |
| WO | WO 2009/052124 A1 | 4/2009 |

OTHER PUBLICATIONS

Journal of Power Sources, Oct. 1, 2004, vol. 136, Issue 2, pp. 334-345, section 7.

Ragheb, A et al., "Effect of current density and perchloric acid concentration on the formation of lead anodes in sulphuric acid baths". Materials and Corrosion, 23, pp. 105-109, Feb. 30, 1972.

* cited by examiner (1)

(7)

ENERGY STORAGE DEVICE, AN INORGANIC GELLED ELECTROLYTE AND METHODS THEREOF

CROSS-REFERENCE TO RELATED APPLICATIONS

This application is a continuation of PCT/IN2010/000439 dated Jun. 28, 2010 and continuation of PCT Application No. PCT/IB2012/053658 dated 18 Jul. 2012 and claims the benefit of Indian patent application 1744/CHE/2010 dated Jun. 22, 2010 and of Indian patent application 2441/CHE/2011 dated Jul. 18, 2011.

FIELD

The present disclosure is related to hybrid capacitors specifically to $PbO_2$/Activated Carbon hybrid ultracapacitors. The present disclosure is also related to hybrid capacitors specifically to $PbO_2$/Activated Carbon hybrid ultracapacitors with an inorganic thixotropic-gelled-polymeric-electrolyte. The hybrid ultracapacitors of the present disclosure is simple to assemble, bereft of impurities and can be fast charged/discharged with high faradaic efficiency.

BACKGROUND

Supercapacitors (also termed as ultracapacitors) are being projected as potential devices that could enable major advances in energy storage. Supercapacitors are governed by the same physics as conventional capacitors but utilize high-surface-area electrodes and thinner dielectrics to achieve greater capacitances allowing energy densities greater than those of conventional capacitors and power densities greater than those of batteries. Supercapacitors can be divided into three general classes, namely electrical-double-layer capacitors, pseudocapacitors and hybrid capacitors. Each class is characterized by its unique mechanism for charge storage, namely faradaic, non-faradaic and the combination of the two. Faradaic processes, such as oxidation-reduction reactions, involve the transfer of charge between electrode and electrolyte as in a battery electrode while a non-faradaic mechanism does not use a chemical mechanism and rather charges are distributed on surfaces by physical processes that do not involve the making or braking of chemical bonds "similar to electrical" double-layer. A hybrid supercapacitor combines a battery electrode where the energy is stored in chemical form and an electrical-double-layer electrode where the energy is stored in physical form. A $PbO_2$/Activated Carbon supercapacitor comprises a positive plate akin to a lead acid cell and a high surface-area activated carbon electrode as negative plate. The charge-discharge reactions at the positive and negative plates of such a hybrid supercapacitors are as follows.

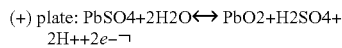

(+) plate: $PbSO_4 + 2H_2O \leftrightarrow PbO_2 + H_2SO_4 + 2H^+ + 2e^-$

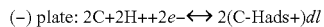

(−) plate: $2C + 2H^+ + 2e^- \leftrightarrow 2(C\text{-}H_{ads}+)dl$

Accordingly, the net charge-discharge reactions for the hybrid supercapacitor can be written as follows.

$PbSO_4 + 2H_2O + 2C \leftrightarrow PbO_2 + H_2SO_4 + 2(C\text{-}H_{ads}+)dl$

The (+) plate is realized by electrochemical plating and cycling in sulphuric acid/perchloric acid while the (−) plate is prepared by pasting activated carbon onto a lead sheet. The said hybrid supercapacitor stores energy both in chemical and physical forms.

The hybrid capacitors known in the prior art employ conventional $PbO_2$ plates that require sizing and mixing of the active materials of—appropriate compositions, pasting, drying, curing and formation. Such electrodes are not fully amenable to fast charge/discharge processes desirous of a capacitor.

SUMMARY

The present disclosure is in relation to an energy-storage device (1) comprising: a substrate-integrated-lead-dioxide electrode (2), an activated-carbon electrode (3), and a separator (4) soaked in an electrolyte (5) and placed in-between the substrate-integrated-lead-dioxide electrode and the carbon electrode in a container (6); an energy storage device (1) comprising: a substrate-integrated-lead-dioxide electrode (2), an activated carbon electrode (3), and a thixotropic inorganic-gel-polymer electrolyte (4) intercepted between the substrate-integrated-lead-dioxide electrode and the carbon electrode; an energy storage unit (7) comprising plurality of energy storage device (1) as mentioned above connected in series; a method of preparing substrate-integrated lead dioxide comprising acts of, a) etching pre-polished lead sheets; b) washing the etched lead sheets with deionized water; c) immersing the washed lead sheets in mixture of sulphuric acid and perchloric acid to obtain a layer of lead sulphate; and d) oxidizing the lead sulphate to lead dioxide to obtain substrate-integrated lead dioxide; a method of manufacturing an energy storage device (1), comprising acts of: a) preparing substrate-integrated-lead-dioxide electrode (2), b) preparing activated-carbon electrode (3), and c) mounting the substrate-integrated-lead-dioxide electrode (2), the activated-carbon electrode (3) either (i) in a container (6) with separator (4) soaked in an electrolyte (5) or (ii) with a thixotropic inorganic-gel-polymer electrolyte (4), in-between the substrate-integrated-lead-dioxide and the carbon electrodes to manufacture the energy-storage device; a method of using energy-storage device (1) or energy storage unit (7) as mentioned above, said method comprising act of conjugating said energy-storage device or unit with electrical energy to supply energy to devices in need thereof.

DRAWINGS

FIG. 1: Schematic diagram of substrate-integrated PbO2/activated-carbon ultracapacitor.

FIG. 2: Schematic diagram of substrate-integrated PbO2/activated-carbon ultra-capacitors connected in series.

FIG. 3: Schematic diagram of electrochemical cell employed for preparing substrate-integrated PbO2 electrodes.

FIG. 4: XRD patterns for the positive electrodes.

FIG. 5: Cyclic voltammograms for a PbO2/Activated Carbon Hybrid Ultracapacitor.

FIG. 6: Constant current charge/discharge cycles.

FIG. 7: Life-cycle test.

FIG. 8: Constant current charge/discharge characteristics.

FIG. 9: Constant-potential charge and constant-current discharge characteristics.

FIG. 10: Cycle-life test for PbO2/PVDF-bonded Activated-Carbon Hybrid Ultracapacitor.

FIG. 11: Constant-current discharge characteristics for 6V/40F PbO2/Activated Carbon Hybrid Ultracapacitor.

DETAILED DESCRIPTION

The present disclosure is in relation to an energy storage device (1) comprising:
a substrate-integrated-lead-dioxide electrode (2),
an activated-carbon electrode (3), and a separator (4) soaked in an electrolyte (5) and placed in-between the substrate-integrated-lead-dioxide electrode and the carbon electrode in a container (6).

The present disclosure is also in relation to an energy storage device (1) comprising:
- a substrate-integrated-lead-dioxide electrode (2),
- an activated carbon electrode (3), and
- a thixotropic inorganic-gel-polymer electrolyte (4) intercepted between the substrate-integrated-lead-dioxide electrode and the carbon electrode.

In an embodiment of the present disclosure, the energy storage device (1) is a hybrid capacitor.

In still another embodiment of the present disclosure, the separator (4) is made of material selected from a group comprising porous glass and porous polymers, preferably porous glass.

In yet another embodiment of the present disclosure, the electrolyte acts as a separator.

In yet another embodiment of the present disclosure, the electrolyte is selected from a group comprising sulphuric acid, methanesulfonic acid, perfluorosulphonic acid, and preferably sulphuric acid.

In yet another embodiment of the present disclosure, the sulphuric acid is concentrated in range from about 4M to about 7M, preferably about 6M.

In yet another embodiment of the present disclosure, the energy storage device (1) is of faradiac efficiency ranging from about 94% to about 96%, preferably 95%.

In yet another embodiment of the present disclosure, the energy storage device (1) is of faradaic efficiency ranging from about 88% to about 90%, preferably about 89%.

The present disclosure is also in relation to an energy-storage unit (7) comprising plurality of energy-storage device (1) as mentioned above connected in series.

The present disclosure is also in relation to a method of preparing substrate-integrated lead dioxide comprising acts of,
- etching pre-polished lead sheets;
- washing the etched lead sheets with deionized water;
- immersing the washed lead sheets in mixture of sulphuric acid and perchloric acid to obtain a layer of lead sulphate; and
- oxidizing the lead sulphate to lead dioxide to obtain substrate integrated lead dioxide.

In still another embodiment of the present disclosure, the etching is carried out using Nitric acid.

In yet another embodiment of the present disclosure, the Nitric acid is of concentration ranging from about 0.5M to about 1.5M, preferably about 1M.

In yet another embodiment of the present disclosure, the sulphuric acid is concentrated in the range from about 4M to about 7M, preferably about 6M.

In yet another embodiment of the present disclosure, the perchloric acid is concentrated in the range from about 0.05M to about 0.2M, preferably about 0.1M.

In yet another embodiment of the present disclosure, the oxidation of lead sulphate to lead dioxide is by using the lead sulphate as an anode in an electrochemical cell.

The present disclosure is also in relation to a method of manufacturing an energy-storage device (1), comprising acts of:
- preparing substrate-integrated-lead-dioxide electrode (2),
- preparing activated carbon electrode (3), and
- mounting the substrate-integrated-lead-dioxide electrode (2), the activated carbon electrode (3) either
  - in a container (6) with separator (4) soaked in an electrolyte (5) or
  - with a thixotropic inorganic-gel-polymer electrolyte (4) in-between the substrate-integrated lead dioxide and the carbon electrode to manufacture the energy storage device.

In yet another embodiment of the present disclosure, the container (6) is made of material selected from a group comprising porous glass and porous polymer, preferably porous glass.

In yet another embodiment of the present disclosure, the thixotropic inorganic-gel-polymer electrolyte acts as a separator.

The present disclosure is also in relation to a method of using energy-storage device (1) or energy storage unit (7), said method comprising act of conjugating said energy-storage device or unit with electrical device for generating electrical energy to devices in need thereof.

The present disclosure is also in relation to an inorganic thixotropic-gelled-polymer-electrolyte.

In an embodiment of the present disclosure, the electrolyte is prepared by cross-linking fumed silica with sulfuric acid.

In an embodiment of the present disclosure, the sulfuric acid has concentration ranging from about 4M to about 7M, preferably about 6M; and the electrolyte is capable of acting as a separator between electrodes of an energy storing device.

The present disclosure is related to realizing substrate-integrated PbO2/Activated-carbon hybrid ultracapacitor bereft of impurities. The hybrid ultra-capacitors of the present disclosure are simple to assemble, bereft of impurities, and can be fast charged/discharged with faradaic efficiencies as high as 95%.

In the current disclosure, the positive electrodes, substrate-integrated $PbO_2$ are made by electrochemical formation of pre-polished and etched lead metal sheets. Specifically, the substrate-integrated $PbO_2$ is obtained by oxidizing $PbSO_4$ which is formed when lead sheets come in contact with sulfuric acid. Subsequent to their formation, the electrodes are washed copiously with de-ionized water to wash off all the impurities. The XRD patterns for the formed electrodes were recorded and found to be free of impurities. The XRD patterns provided in the FIG. 4 clearly suggest the formation of lead dioxide. The negative electrode is an activated carbon electrode.

In the current disclosure of $PbO_2$/Activated carbon hybrid ultracapacitor, $PbO_2$ electrode is a battery-type electrode and activated carbon is a double-layer-capacitor electrode. FIG. 5 is a cyclic voltammogram for $PbO_2$/activated carbon hybrid ultracapacitor at a scan rate of 10 mV/s showing a peak for the oxidation of $PbSO_4$ to $PbO_2$ at 2V during the anodic scan and the corresponding reduction of $PbO_2$ to $PbSO_4$ at 1.5V during the cathodic scan. The oxidation and reduction peaks reflect the $PbO_2$/Activated carbon to be a hybrid device.

Generally, the battery electrodes are charged at C/10 rate (10 h duration) and discharged at C/5 rate (5 h duration). If the battery electrodes are charged/discharged at C rate or at higher rates their cycle-life is affected. Faradaic efficiency of the battery electrodes depends on the particle size of the active materials, porosity of the electrode, internal resistance of the electrode, etc. The battery electrodes have low faradaic efficiency.

The present disclosure provides, electrochemically formed and substrate-integrated $PbO_2$ as battery-type electrode that can be charged and discharged at higher rates with faradiac efficiencies as high as 95%. The same has been illustrated in FIG. 8. The FIG. 8 shows current charge and discharge curve at 50 mA for the substrate-integrated $PbO_2$/Activated hybrid ultracapacitor exhibiting faradiac efficiency as high as 95%.

FIG. 6 shows the charge and discharge polarization curves at 25 mA, 50 mA and 100 mA for a substrate-integrated $PbO_2$/Activated carbon hybrid ultracapacitor prepared by using Teflon as binder in the carbon electrodes. The capacitance is calculated from the discharge curve using the equation:

$$C(F)=I(A) \times t(s)/(V2-V1)$$

where V2 is the voltage at the beginning of discharge and V1 is the voltage at the end of discharge. It is found that the hybrid ultracapacitor has a capacitance of 10.79 F at 25 mA, 10.05 F at 50 mA and 9.738 F at 100 mA.

The FIG. 7 shows the cycle-life data for the substrate-integrated PbO2/Activated carbon hybrid ultracapacitor at 0.1 A suggesting the hybrid ultracapacitors to have high cycle-life. The cycle-life test involves the following four steps.

Step 1. Charging the ultracapacitor at 2.3V for 10 min.
Step 2. Open-circuit voltage measurement for 5 s.
Step 3. Discharge the ultracapacitor at constant current at 0.2 A.
Step 4. Open-circuit voltage measurement for 30 s.

Pulsed cycle-life test for the energy storage device with thixotropic inorganic gel polymer electrolyte involves the following four steps.

Step 1. Charging the ultracapacitor at 3 A for 1 s.
Step 2. Open-circuit voltage measurement for 5 s.
Step 3. Discharge the ultracapacitor at constant current at 3 A.
Step 4. Open-circuit voltage measurement for 5 s.

The hybrid capacitor of the present disclosure is connected in series to obtain capacitors wherein the cell voltage gets added up while their effective capacitance decreases akin to conventional capacitor.

Figure 11:
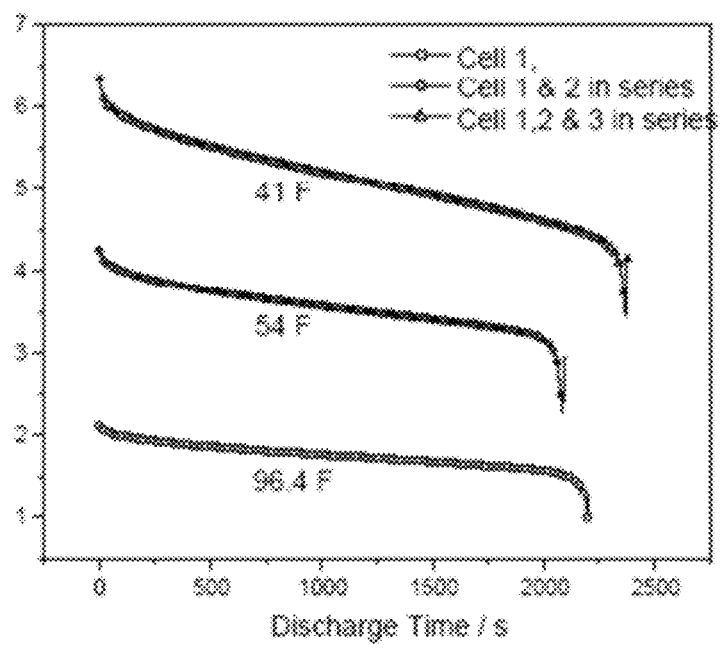

FIG. 11 shows the discharge curves at 0.2 A current for substrate-integrated PbO2/Activated-carbon hybrid ultracapacitor cell comprising two and three cells connected in series. The figure indicates that the cell voltage is added up when two or more cells are connected in series while their effective capacitances decrease akin to conventional capacitors.

The method of manufacturing substrate-integrated PbO2/activated-carbon hybrid ultracapacitor (1) essentially comprises: preparing substrate integrated lead dioxide electrode (2), preparing activated-carbon electrode (3), and mounting the substrate-integrated-lead-dioxide electrode (2), the activated-carbon electrode (3) in a container (6) with separator (4) soaked in an electrolyte (5) in-between the substrate-integrated lead dioxide and the carbon electrode to manufacture the energy-storage device.

The present disclosure also discloses substrate-integrated PbO2/activated-carbon hybrid ultracapacitors (HUC) with an inorganic thixotropic-gelled-polymer-electrolyte, which also acts as a separator. The gelled separator herein enhances the overall performance of the HUC with respect to critical parameters, such as capacitance and cycle-life.

The devices of the present disclosure can be easily conjugated with electrical devices for generating electrical energy to devices in need thereof for working.

The technology of the instant application is elaborated in detail with the help of following examples. However, the examples should not be construed to limit the scope of the disclosure.

Examples

Preparation of substrate-integrated PbO2/Activated Carbon Hybrid Ultracapacitors A. Preparation of Substrate-Integrated PbO2 Electrodes.

Figure 1:
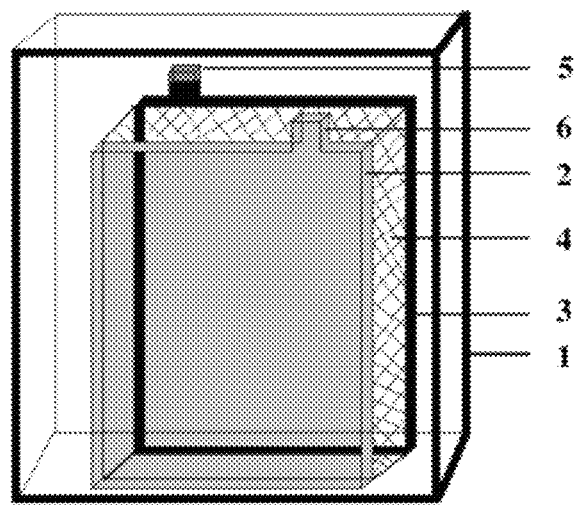
Figure 2:
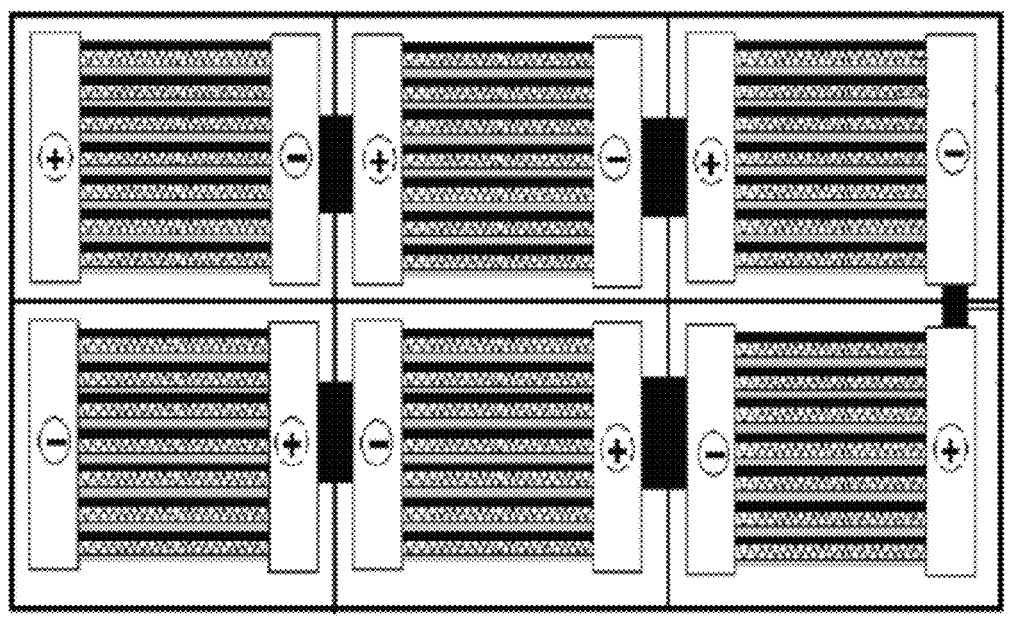
Figure 3:
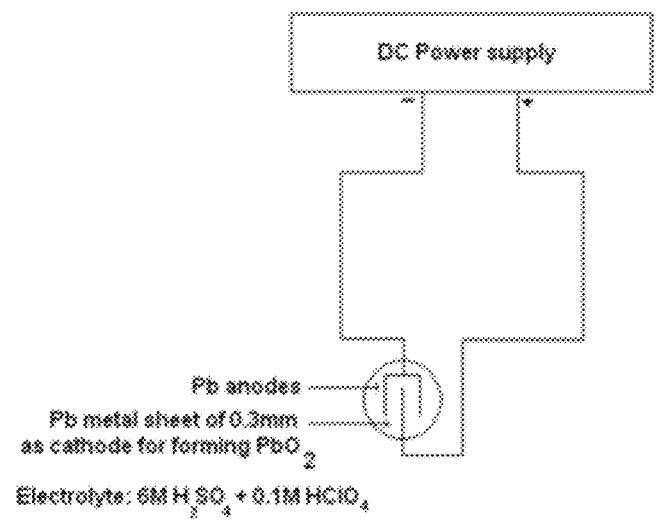
Figure 4:
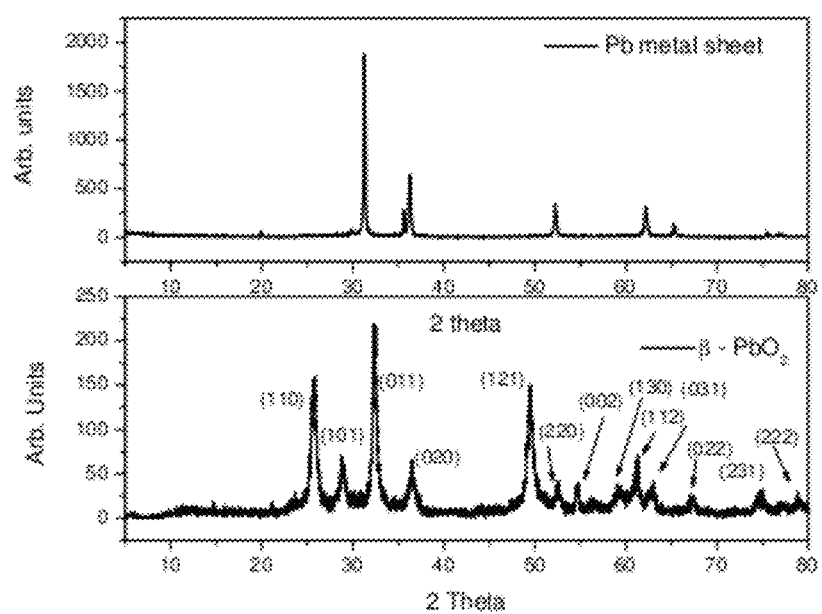
Figure 5:
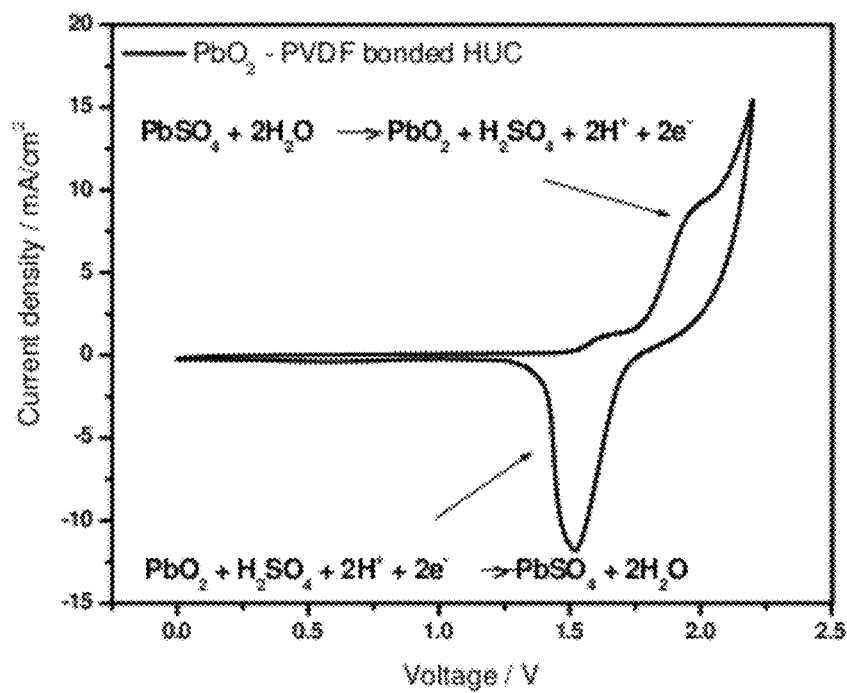
Figure 6:
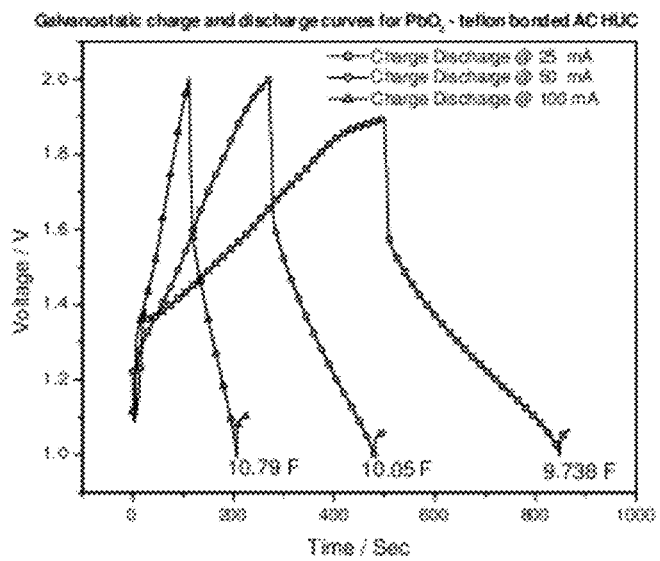
Figure 7:
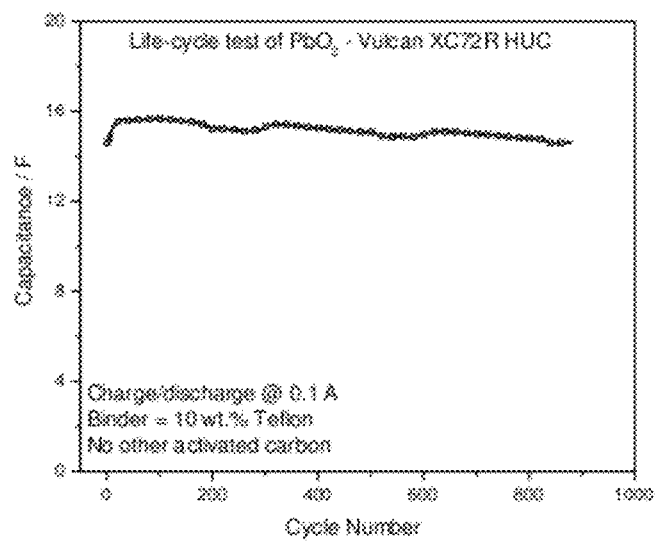
Figure 8:
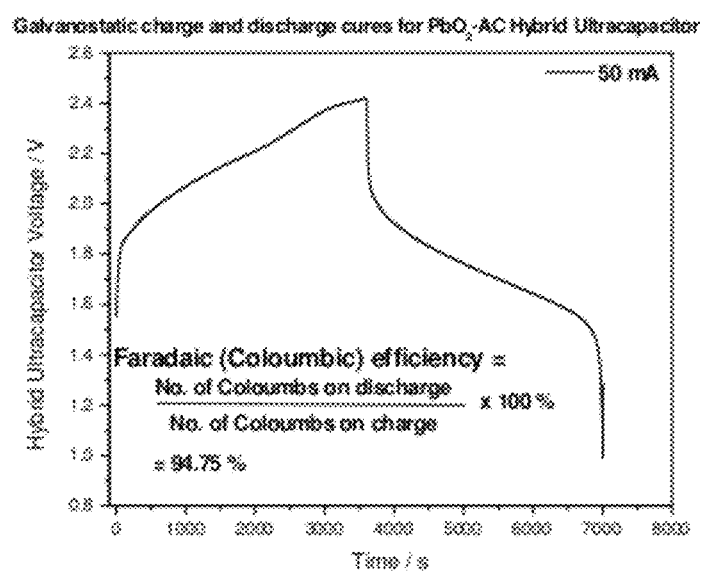
Figure 9:
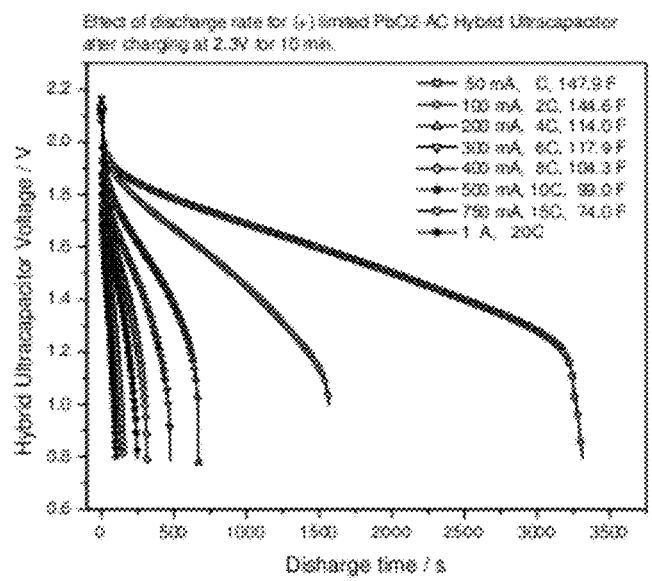
FIG. 9 illustrates the discharge curves at varying currents for the substrate-integrated PbO2/Activated-carbon hybrid ultracapacitor followed by their charging at 2.3V for 10 min.
Figure 10:
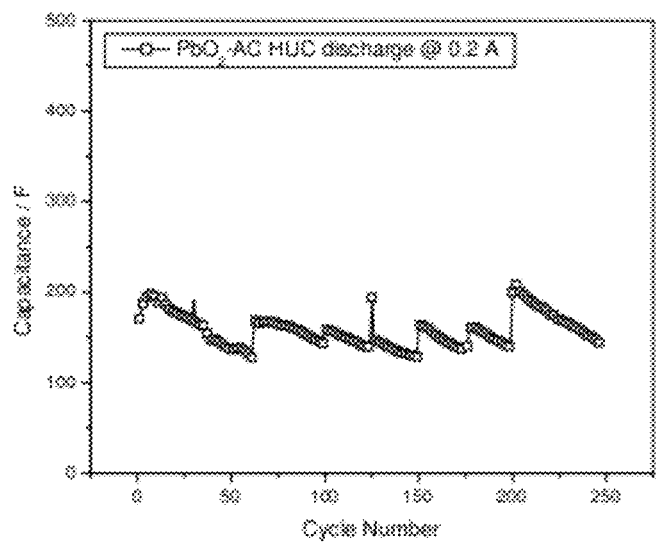
FIG. 10 shows the cycle-life data for the substrate-integrated PbO2/Activated-carbon hybrid ultracapacitor.

Substrate-integrated-PbO2 electrodes are prepared by etching pre-polished lead sheets (thickness 300 □m) in 1M HNO3 for 60 s and subsequently washed copiously with deionized water. The sheets were then immersed in 6 M aqueous H2SO4 with 0.1 M HClO4 as additive at room temperature. On immersing in aqueous sulfuric acid, a thin layer of lead sulfate is formed on the surface of the lead sheet which is oxidized to PbO2 by using it as anode in an electrochemical cell fitted with a counter electrode. The process is repeated for about five times to prepare the fully-formed substrate-integrated PbO2 electrodes. The electrochemical cell employed for this purpose is connected to a constant current dc supply as shown schematically in FIG. 3.

B. Preparation of PVDF Bonded Activated Carbon Electrodes.

Activated-carbon electrodes are prepared by pasting activated carbon ink containing polyvinylidene difluoride (PVDF) as a binder. In brief, a carbon paste was obtained by mixing 85% of high-surface-area carbon (BET surface area is about 2000 m2/g and particle size <10 nm or of about 10 μm) with 10 wt. % of carbon black (particle size is about 1 □m) and 5 wt. % of binder like PVDF dissolved in an appropriate quantity of dimethylformamide solvent or Teflon (PTFE, poly-tetrafluoroethylene). Typically, 0.1 g of PVDF is dissolved in 10 ml of DMF and 1.7 g of high surface area carbon (Meadwestvaco product no. 090177) and 0.2 g of carbon black was added. The mixture was mixed well in an ultrasonicator for 5 min. The resulting carbon ink was brush coated onto two graphite electrodes of area 3.5 cm×6.0 cm or 4.5 cm×7 cm which had a tag area of 1 cm width and 3 cm length or 0.5 cm width and 0.5 cm length, respectively. The carbon paste was applied on both sides of the carbon electrodes so that each side of the electrode in order to get a 0.5 g of active material. Then the electrodes were dried in air oven for overnight (about 10 h) at 80° C.

C. Assembly of Substrate-Integrated PbO2-AC Hybrid Ultracapacitors (HUCs)

a) 6V Substrate-Integrated PbO2-AC Hybrid Ultracapacitor.

6V substrate-integrated PbO2-AC HUCs were assembled by connecting three 2V HUCs in series. 2V/100 F substrate-integrated PbO2/PVDF-bonded AC HUCs comprising a substrate-integrated PbO2 electrode of size 3.5 cm×6 cm with a tag of 1 cm width and 3 cm length formed by aforementioned method and a PVDF-bonded carbon electrode prepared as described above were assembled using a 3 mm thick AGM (adsorbed glass mat) soaked with 6 M H2SO4 acid as the separator and electrolyte. The complete assembly, PbO2—(AGM+H2SO4)—AC, was then assembled into a plexiglass container. The cell was then tested for its electrochemical characteristics.

b) 12V Substrate-Integrated PbO2-AC Hybrid Ultracapacitor.

12V PbO2-AC HUCs were assembled by connecting six HUCs in series. The details for assembling the HUCs are given as under.

2V/100 F substrate-integrated PbO2/PVDF-bonded AC HUCs comprising a substrate-integrated PbO2 electrode of size 3.5 cm×6 cm with tags (6a, 6b) of 1 cm width and 3 cm length formed by aforementioned method and a PVDF-bonded carbon electrode prepared as described above were assembled using a 3 mm thick AGM (adsorbed glass mat) soaked with 6 M H2SO4 acid as the separator and electrolyte. The complete assembly, PbO2-(AGM+H2SO4)-AC, was then assembled into a plexiglass container. The cell was then tested for its electrochemical characteristics.

c) 12V Substrate-Integrated PbO2-AC Hybrid Ultracapacitor.

A 12V substrate-integrated PbO2/Activated carbon hybrid ultracapacitor was realized by connecting six single cells in series in a commercial lead-acid battery container. Each cell of this 12V hybrid ultracapacitor comprises 9 positive and 8 negative plates of size 4.5 cm×7 cm with the tag (6b) area of 0.5 cm×0.5 cm and 0.3 mm thickness for the positive plate and 0.8 mm thickness for negative plates (6a); 1 mm thick AGM sheets were used as separator. A unique method was used to interconnect the graphite electrodes. The tag portion of the negative electrodes (6a) is electroplated with Tin followed by electroplating with lead which facilitates the graphite electrode tags (6b) to solder with each other. The graphite electrodes in each cell were soldered with lead by torch-melt method using an appropriately designed group-burning fixture. Subsequently, the cells were interconnected in series.

d) Assembly of 12V Substrate-Integrated PbO2-AC Hybrid Ultracapacitors (HUCs).

A 12V substrate-integrated PbO2/Activated carbon hybrid ultracapacitor was realized by connecting six single cells in series in a commercial lead-acid battery container. Each cell of this 12V hybrid ultracapacitor comprises 9 positive and 8 negative plates, each of size 4.5 cm×7 cm, with the tag area of 0.5 cm×0.5 cm and 0.3 mm thickness for the positive plate and 0.8 mm thickness for negative plates. An inorganic thixotropic-gelled-polymer-electrolyte that was also used as a separator was prepared by cross-linking fumed silica with 6 M sulfuric acid. A unique method was used to interconnect the graphite electrodes. The tag portion of the negative electrodes is electroplated with tin, followed by electroplating with lead, which facilitates the graphite electrode tags to be soldered to each other. The graphite electrodes in each cell were soldered with lead by torch-melt method using an appropriately designed group-burning fixture. Subsequently, the cells were interconnected in series.

The gelled electrolyte separator used herein enhances the overall performance of the HUC with respect to critical parameters such as cycle-life and capacitance. The comparative data for the 12V Absorbent Glass-Mat (AGM)-HUC and 12 V Gelled-HUC is given in Table 1 below.

TABLE 1

Comparison between AGM-HUC and Gelled-HUC.

|  | AGM-HUC | Gelled-HUC |
|---|---|---|
| Internal Resistance | 90 m ohm | 120 m ohm |
| Faradaic Efficiency | 91% | 89% |
| Capacitance |  |  |
| 300 mA | 184 F. | 269 F. |
| 600 mA | 163 F. | 255 F. |
| 900 mA | 150 F. | 239 F. |
| 1.2 A | 138 F. | 222 F. |
| 1.5 A | 130 F. | 208 F. |
| Leakage Current after 24 h | 15 mA | 35 mA |
| Self Discharge after 24 h | 13% | 16% |

It is found that these hybrid ultracapacitors yield a capacitance value of 120 F at 5 C rate of discharge.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An energy storage device (1) comprising:
   a) a substrate-integrated-lead-dioxide electrode (2),
   b) a pure activated carbon double layer capacitor electrode (3), and
   c) a thixotropic inorganic-gel-polymer electrolyte (4) intercepted between the substrate-integrated-lead-dioxide electrode and the carbon electrode.

2. The energy-storage device as claimed in claim 1, wherein the energy storage device (1) is a hybrid capacitor.

3. The energy storage device as claimed in claim 1, wherein the electrolyte acts as a separator.

4. The energy-storage device as claimed in claim 1, wherein the electrolyte is selected from a group comprising sulphuric acid, methanesulfonic acid, perflourosulphonic acid, preferably sulphuric acid.

5. The energy storage device as claimed in claim 4, wherein the sulphuric acid is concentrated in range from about 4M to about 7M, preferably about 6M.

6. The energy storage device as claimed in claim 1, wherein the energy storage device (1) is of faradaic efficiency ranging from about 88% to about 90%, preferably about 89%.

7. An energy storage unit (7) comprising plurality of energy storage devices (1) wherein each of the energy storage devices has
   a) a substrate-integrated-lead-dioxide electrode (2),
   b) a pure activated carbon double layer capacitor electrode (3), and
   c) a thixotropic inorganic-gel-polymer electrolyte 4 intercepted between the substrate-integrated-lead-dioxide electrode and the sure activated carbon double layer capacitor electrode
   and the energy storage devices are connected in series.

8. The energy storage device as claimed in claim 6, wherein the substrate-integrated-lead-dioxide electrode (2) is etched by nitric acid having a of concentration from about 0.5M to about 1.5M, preferably about 1M.

* * * * *